United States Patent [19]
Chen

[11] Patent Number: 5,984,597
[45] Date of Patent: Nov. 16, 1999

[54] MILLING APPARATUS FOR FORMING A KEY BIT

[75] Inventor: Tzung-Nan Chen, Kaohsiung, Taiwan

[73] Assignee: Chieh Yung Automation Corp., Taiwan

[21] Appl. No.: 09/143,375

[22] Filed: Aug. 28, 1998

[51] Int. Cl.[6] ................................. B23C 9/00; B23C 3/35
[52] U.S. Cl. ............................. 409/137; 409/81; 451/456
[58] Field of Search ................................. 409/82, 83, 81, 409/134, 137; 451/456, 451

[56] References Cited

U.S. PATENT DOCUMENTS

| | | | |
|---|---|---|---|
| 5,171,112 | 12/1992 | Roland ................................. | 409/137 X |
| 5,443,337 | 8/1995 | Heredia et al. ............................. | 409/81 |

*Primary Examiner*—William Briggs
*Attorney, Agent, or Firm*—Banner & Witcoff, Ltd.

[57] ABSTRACT

A milling apparatus for forming a key bit includes a base, and a key holding member positioned in front of the base. The key holding member includes an upper clamping plate and a lower clamping plate, which are adapted to clamp a key blank therebetween. A carrier is mounted movably on the base. A hollow body is mounted slidably on the carrier, and has an interior chamber and a concave front face unit which is formed with a cross groove. The cross groove has a vertical section and a horizontal section which is adapted to be aligned with the key blank that is clamped between the upper and lower clamping plates of the key holding member. A milling cutter is mounted rotatably within the interior chamber in the hollow body, and extends into the vertical section of the cross groove in the front face unit of the hollow body. A resilient unit biases the concave front face unit of the hollow body to contact the upper and lower clamping plates of the key holding member, thereby locating the upper and lower clamping plates on two sides of the horizontal section of the cross groove. A waste collector is adapted to suck metal waste from the interior chamber.

3 Claims, 6 Drawing Sheets

5,984,597

MILLING APPARATUS FOR FORMING A KEY BIT

BACKGROUND OF THE INVENTION

1. Field of the Invention

This invention relates to a milling apparatus for forming a key bit, and more particularly to a milling apparatus which can prevent metal waste from flying out of the milling apparatus.

2. Description of the Related Art

Referring to FIGS. 1 to 3, a conventional milling apparatus for forming a key bit 1 is shown to include a base 11, a carrier 12 mounted movably on the base 11, and a hollow body 13 which is fixed on the carrier 12. The hollow body 13 has an interior chamber 130, in which a milling cutter 14 is mounted rotatably. A waste collector 15 is coupled with the hollow body 13 to suck metal waste created in the interior chamber 130 in the hollow body 13. A key holding member 16 is positioned in front of the base 11, and has an upper clamping plate 161 and a lower clamping plate 162, which are adapted to clamp a key blank 2 therebetween. Two opposed pushing merrbers 131 are provided on the hollow body 13, and are biased respectively by two comoression springs 132 to press against the upper and lower clamping plates 161, 162.

In operation, the carrier 12 is moved on the base 11 from the position shown in FIG. 1 to that in FIG. 2, thereby pressing the pushing members 131 against the key holding member 16. Then, the hollow body 13 is moved from the position indicated by solid lines in FIG. 3 to that indicated by phantom lines in FIG. 3 to form a specific-shaped key bit on the key blank 2. As best shown in FIG. 3, during the milling process, a clearance 17 is formed between the hollow body 13 and the key holding member 16. As a result, metal waste created from the key blank 2 fly out of the apparatus via the clearance 17, and cannot be sucked entirely into the waste collector 15. Furthermore, as illustrated, one of the pushing members 131 may separate from the key holding member 16, thereby affecting adversely the quality of the product and even damaging the milling cutter 14.

SUMMARY OF THE INVENTION

The object of this invention is to provide a milling apparatus for forming a key bit, which can prevent metal waste from flying out of the apparatus.

According to this invention, a milling apparatus for forming a key bit includes a base, and a key holding member positioned in front of the base. The key holding member includes an upper clamping plate and a lower clamping plate, which are adapted to clamp a key blank therebetween. A carrier is mounted movably on the base. A hollow body is mounted slidably on the carrier, and has an interior chamber and a concave front face unit which is formed with a cross groove. The cross groove has a vertical section and a horizontal section which is adapted to be aligned with the key blank that is clamped between the upper and lower clamping plates of the key holding member. A milling cutter is mounted rotatably within the interior chamber in the hollow body, and extends into the vertical section of the cross groove in the front face unit of the hollow body. A resilient unit biases the concave front face unit of the hollow body to contact the upper and lower clamping plates of the key holding member, thereby locating the upper and lower clawing plates on two sides of the horizontal section of the cross groove. A waste collector is adapted to suck metal waste from the interior chamber.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
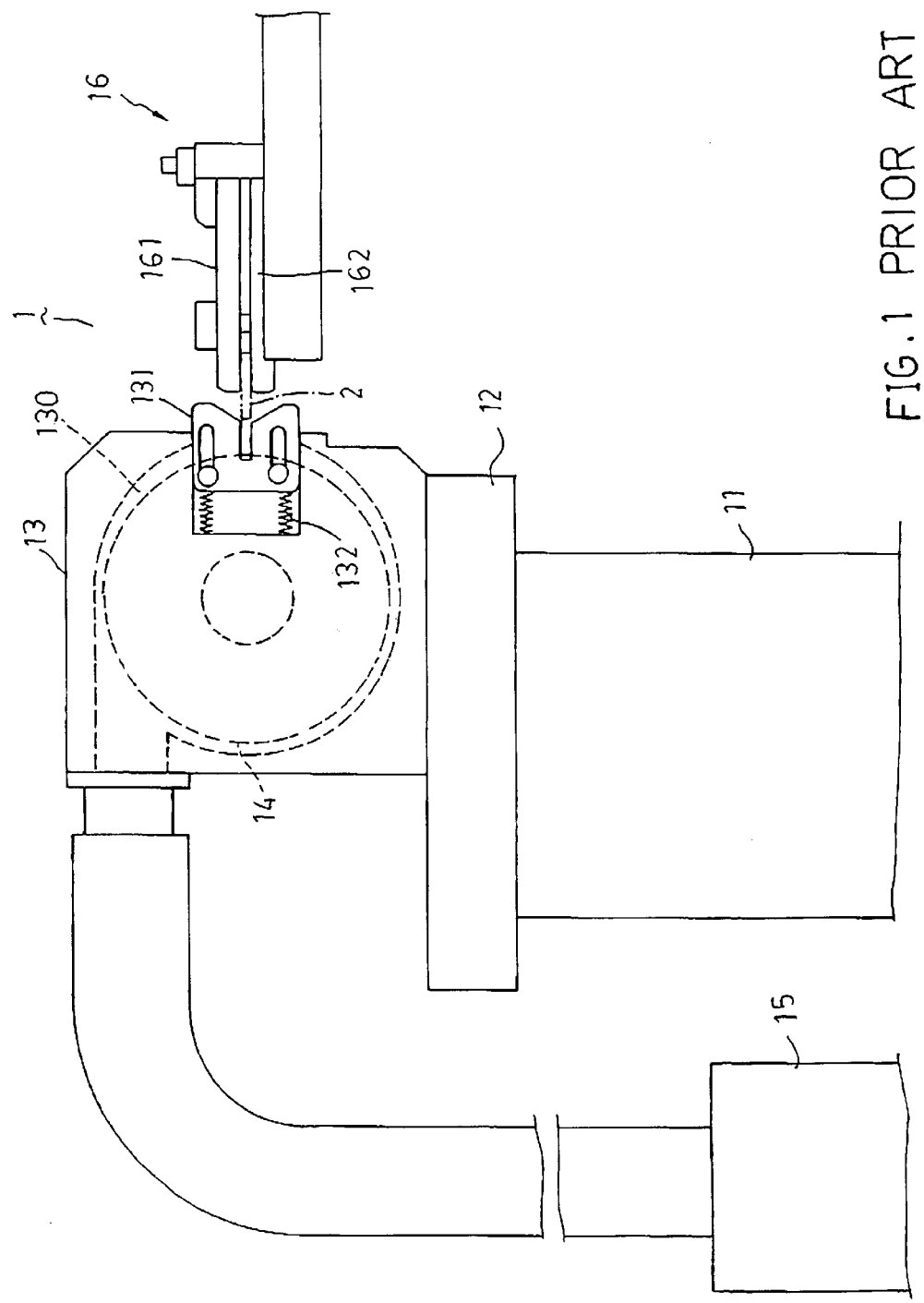
FIG. 1 is a schematic side view of a conventional milling apparatus for forming a key bit, in which a hollow body is spaced apart from a key holding member.
Figure 2:
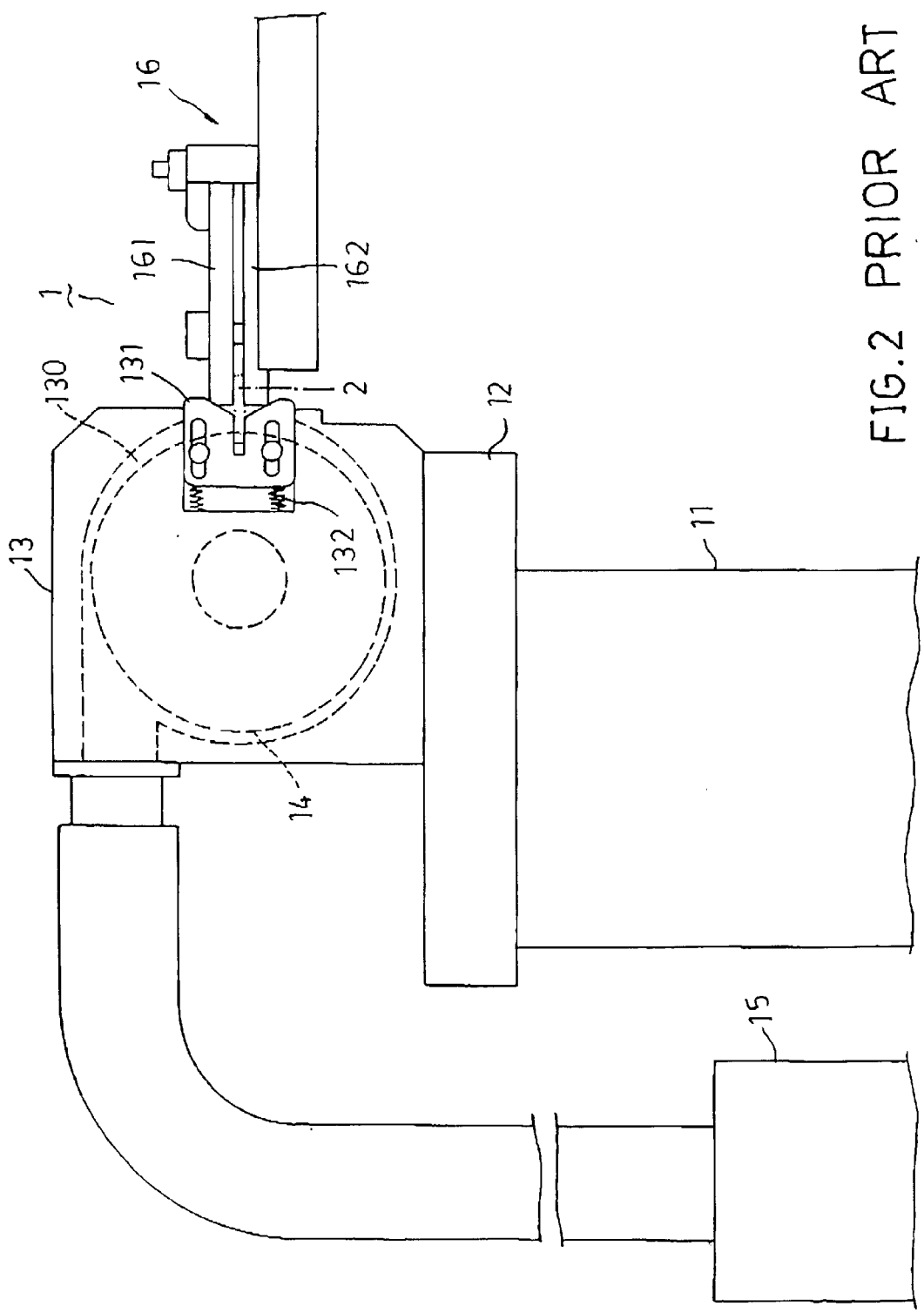
FIG. 2 is a schematic side view of the conventional milling apparatus of FIG. 1, in which the hollow body engages the key holding member.
Figure 3:
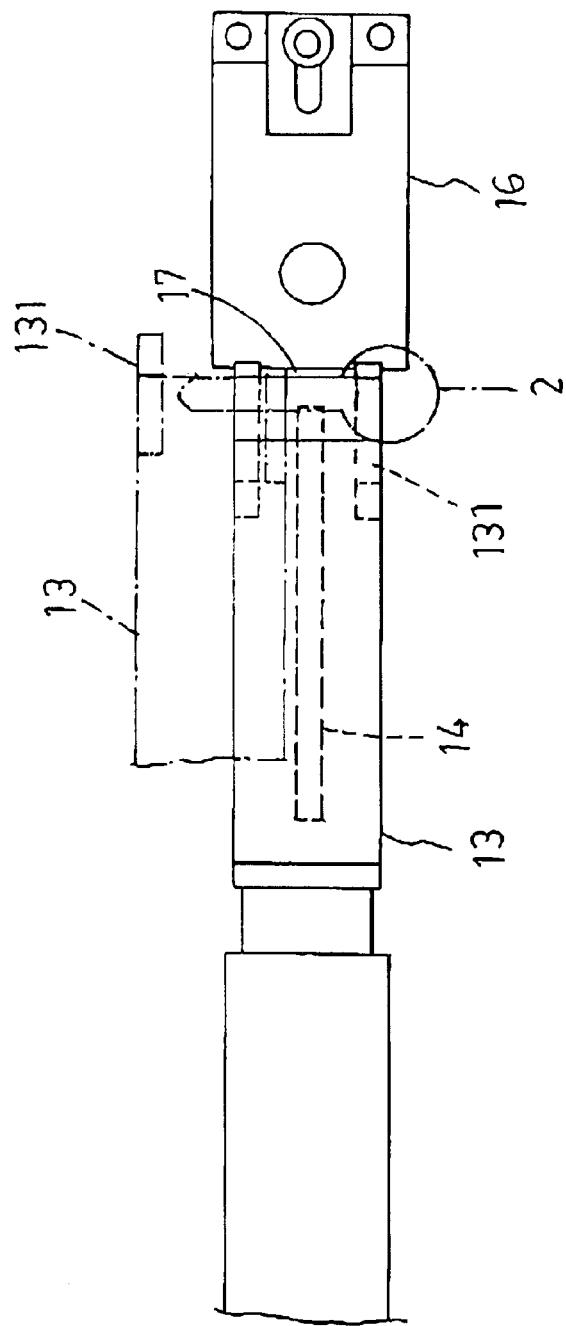
FIG. 3 is a schematic top view illustrating how the hollow body of the conventional milling apparatus of FIG. 1 is moved relative to the key holding member to cut a key blank.
Figure 4:
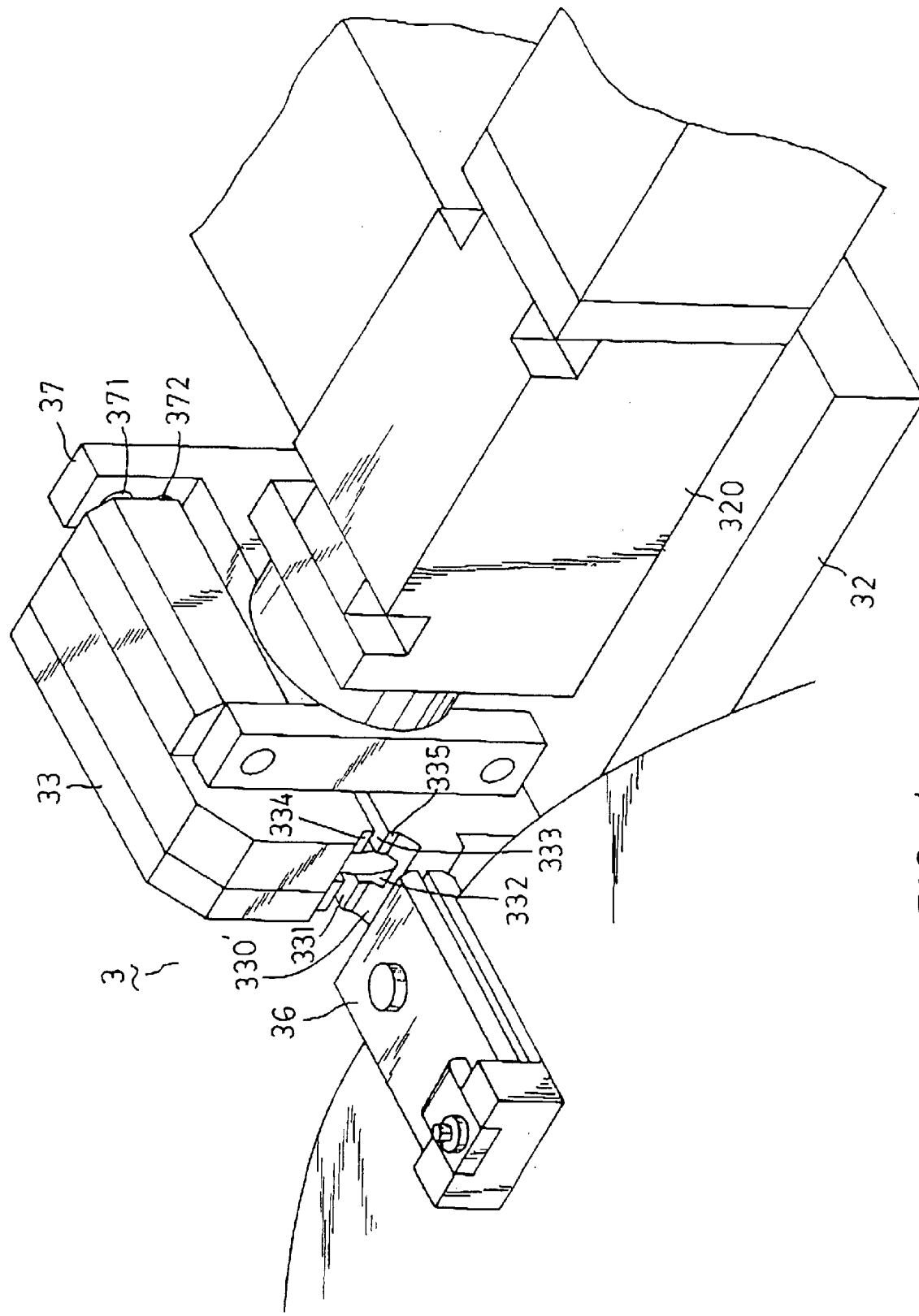
FIG. 4 is a perspective view of the preferred embodiment of a milling apparatus for forming a key bit according to this invention, in which a waste collector is removed.
Figure 5:
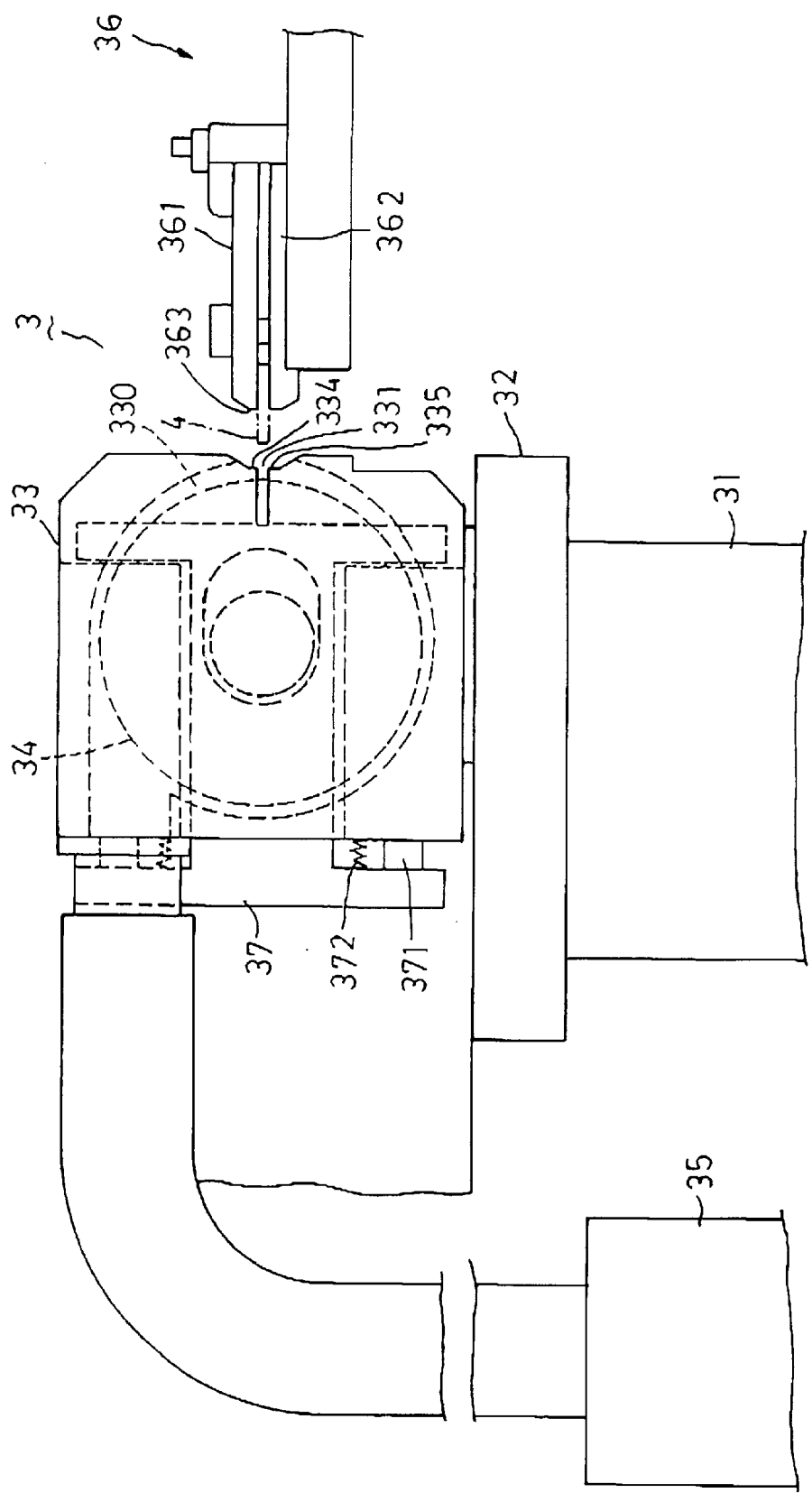
FIG. 5 is a schematic side view of the preferred embodiment, in which a hollow body is spaced apart from a key holding member.

Referring to FIGS. 4 and 5, the preferred embodiment of a milling machine for forming a key bit according to this invention is shown to include a base 31 and a carrier 32 which is mounted movably on the base 31 in a known manner. The carrier 32 includes a motor housing 320 fixed thereon, a motor (not shown) housed within the motor housing 320, a post 37 fixed on the motor housing 320, and two parallel supporting rails 371, each of which is secured to the post 37 at an end thereof. A key holding member 36 is positioned in front of the base 31, and includes an upper clamping plate 361 and a lower clamping plate 362 which are adapted to clamp a key blank 4 therebetween.

The hollow body 33 has two hole units (not shown) formed therethough, whereby the hollow body 33 is sleeved slidably on the rails 371. A resilient unit includes two compression springs 372, which are interposed between the post 37 and the hollow body 33 for biasing the hollow body 33 to move toward the key holding member 36. The hollow body 33 further has an interior chamber 330 within which a milling cutter 34 is mounted rotatably, and a concave front face unit 330' which is formed with a cross groove 331. The milling cutter 34 can be driven by the motor (not shown) in the motor housing 320. The cross groove 331 has a vertical section 332 and a horizontal section 333 which is adapted to be aligned with the key blank 4 that is clamped between the upper and lower clamping plates 361, 362. As illustrated, the milling cutter 34 extends into the vertical section 332 of the cross groove 331 in the concave front face unit 330' of the hollow body 33.

Figure 6:
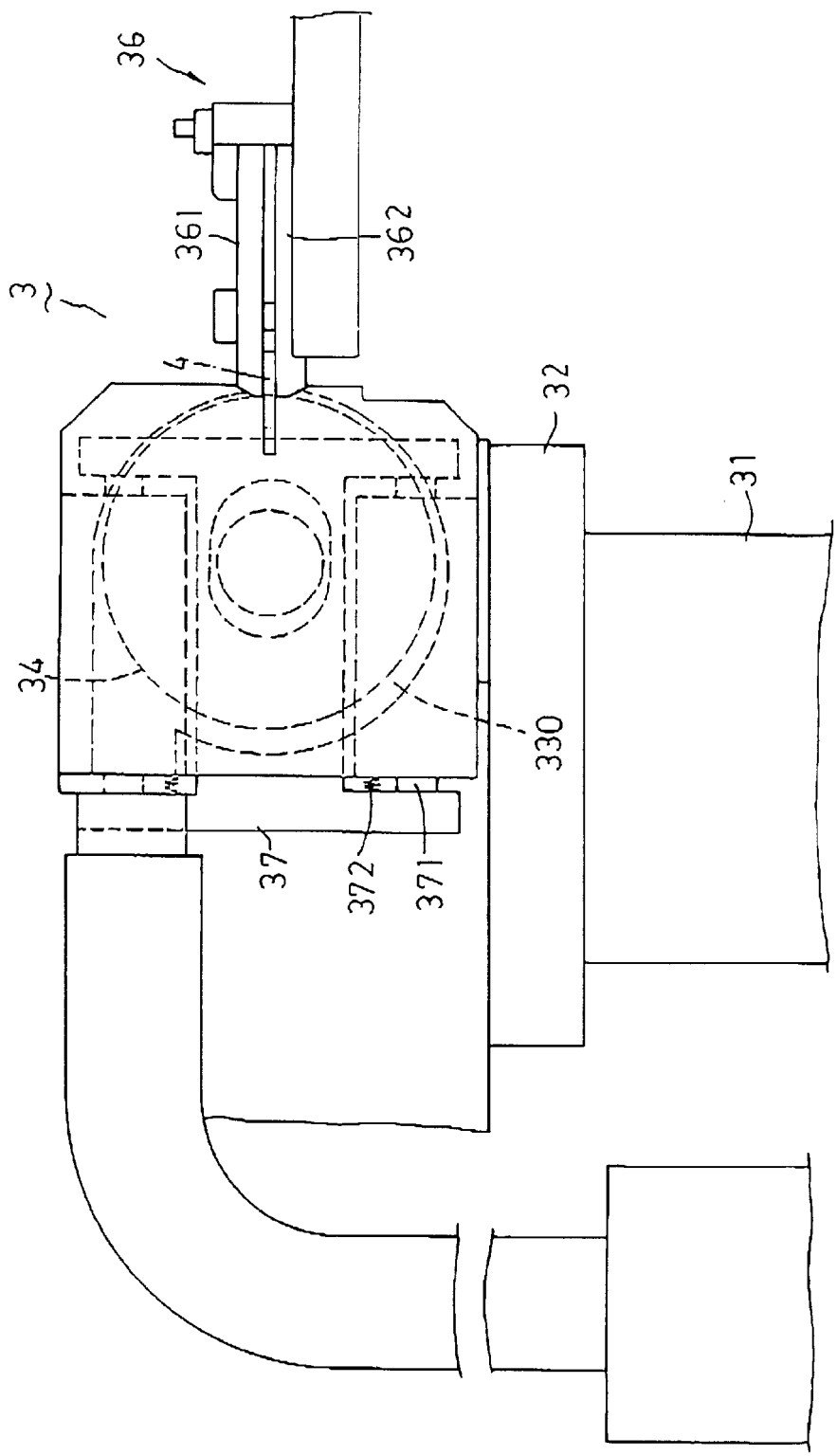
FIG. 6 is a schematic side view of the preferred embodiment, in which the hollow body engages the key holding member.

Particularly, the front face unit 330' of the hollow body 33 has two aligned vertical upper faces 334 and two aligned vertical lower faces 335. The vertical section 332 of the cross groove 331 is located between the upper faces 334 and between the lower faces 335. The horizontal section 333 of the cross groove 331 is located between the upper faces 334 and the lower faces 335. Each of the upper and lower clamping plates 361, 362 of the key holding member 36 has a vertical engaging surface 363. When the carrier 32 is moved on the base 31 from the position shown in FIG. 5 to that in FIG. 6 in a known manner, the upper faces 334 of the hollow body 33 press against the engaging surface 363 of the upper clamping plate 361, and the lower faces 335 of the hollow body 33 press against the engaging surface 363 of the lower clamping plate 362. When the milling cutter 34 cuts the key blank 4 which is held on the key holding member 36, metal waste created in the interior chamber 330 in the hollow body 33 are sucked entirely into the waste collector 35, and cannot fly out of the apparatus 3.

With this invention thus explained, it is apparent that numerous modifications and variations can be made without departing from the scope and spirit of this invention. It is therefore intended that this invention be limited only as indicated by the appended claims.

I claim:

1. A milling apparatus for forming a key bit, comprising:

a base;

a key holding member positioned in front of said base, and including an upper clamping plate and a lower clamping plate, which are adapted to clamp a key blank therebetween;

a carrier mounted movably on said base;

a hollow body mounted slidably on said carrier and having an interior chamber and a concave front face unit which is formed with a cross groove, said cross groove having a vertical section and a horizontal section which is adapted to be aligned with the key blank that is clamped between said upper and lower clamping plates of said key holding member;

a milling cutter mounted rotatably within said interior chamber in said hollow body and extending into said vertical section of said cross groove in said front face unit of said hollow body;

a resilient unit biasing said concave front face unit of said hollow body to contact said upper and lower clamping plates of said key holding member, thereby locating said upper and lower clamping plates on two sides of said horizontal section of said cross groove; and a waste collector adapted to suck metal waste from said interior chamber.

2. A milling apparatus as claimed in claim 1, wherein said front face unit of said hollow body has two aligned vertical upper faces and two aligned lower faces, said vertical section of said cross groove being located between said upper faces and between said lower faces, said horizontal section of said cross groove being located between said upper faces and said lower faces, each of said upper and lower clamping plates of said key holding member having a vertical engaging surface, said upper faces of said hollow body pressing against said engaging surface of said upper clamping plate upon engagement of said hollow body with said key holding member, said lower faces of said hollow body pressing against said engaging surface of said lower clamping plate upon engagement of said hollow body with said key holding member.

3. A milling machine as claimed in claim 1, wherein said carrier includes a motor housing fixed thereon, a post fixed on said motor housing, and two parallel supporting rails, each of which is secured to said post at an end thereof, said hollow body being sleeved slidably on said rails and being located between said post and said key holding member, said resilient unit including two compression springs which are interposed between said post and said hollow body for biasing said hollow body to move toward said key holding member.

\* \* \* \* \*